United States Patent
Childs

(10) Patent No.: US 8,091,830 B2
(45) Date of Patent: Jan. 10, 2012

(54) STRINGER FOR AN AIRCRAFT WING AND A METHOD OF FORMING THEREOF

(75) Inventor: Thomas Childs, Bristol (GB)

(73) Assignee: Airbus Operations Limited, Bristol (GB)

( * ) Notice: Subject to any disclaimer, the term of this patent is extended or adjusted under 35 U.S.C. 154(b) by 406 days.

(21) Appl. No.: 12/304,530

(22) PCT Filed: Jul. 19, 2007

(86) PCT No.: PCT/GB2007/050417
§ 371 (c)(1),
(2), (4) Date: Dec. 12, 2008

(87) PCT Pub. No.: WO2008/012570
PCT Pub. Date: Jan. 31, 2006

(65) Prior Publication Data
US 2009/0194636 A1   Aug. 6, 2009

(30) Foreign Application Priority Data
Jul. 26, 2006 (GB) .................. 0614837.3

(51) Int. Cl.
*B64C 3/00* (2006.01)
(52) U.S. Cl. .................. 244/123.8; 244/123.1
(58) Field of Classification Search ............ 244/123.8, 244/123.1, 120, 117 R, 118.1; 29/897.2
See application file for complete search history.

(56) References Cited

U.S. PATENT DOCUMENTS

| 3,034,608 | A | * | 5/1962 | Dengler | 52/836 |
| 4,907,735 | A | * | 3/1990 | Ushioda et al. | 228/173.4 |
| 6,049,982 | A | * | 4/2000 | Tseng | 29/897.2 |
| 6,190,484 | B1 | * | 2/2001 | Appa | 156/189 |
| 6,266,990 | B1 | * | 7/2001 | Shook et al. | 72/256 |
| 6,276,740 | B1 | * | 8/2001 | Mellor et al. | 296/72 |
| 6,532,641 | B2 | * | 3/2003 | Hillier | 29/527.4 |
| 6,964,096 | B2 | * | 11/2005 | Tryland | 29/897.2 |
| 2003/0131645 | A1 | * | 7/2003 | Tryland | 72/254 |
| 2006/0064874 | A1 | * | 3/2006 | Bonnville et al. | 29/897 |
| 2008/0265094 | A1 | * | 10/2008 | Van Der Veen et al. | 244/123.1 |
| 2010/0043231 | A1 | * | 2/2010 | Young et al. | 29/897.2 |

FOREIGN PATENT DOCUMENTS

| CA | 2317366 A1 | 3/2001 |
| GB | 342268 | 1/1931 |

OTHER PUBLICATIONS

British Search Report for GB0614837.3 dated Sep. 26, 2006.

* cited by examiner

*Primary Examiner* — Joshua Michener
*Assistant Examiner* — Medhat Badawi
(74) *Attorney, Agent, or Firm* — Lowe, Hauptman, Ham & Berner, LLP

(57) ABSTRACT

The present invention relates to a stringer for an aircraft wing and a method of forming such a stringer in which the stringer is formed from a single piece of material and then machined to optimise the dimensions and weight of the stringer.

10 Claims, 6 Drawing Sheets

STRINGER FOR AN AIRCRAFT WING AND A METHOD OF FORMING THEREOF

RELATED APPLICATIONS

The present application is based on International Application Number PCT/GB2007/050417 filed Jul. 19, 2007, and claims priority from British Application Number 0614837.3 filed Jul. 26, 2006, the disclosures of which are hereby incorporated by reference herein in their entirety.

FIELD OF INVENTION

The present invention relates to a stringer for an aircraft wing and a method of forming such a stringer.

BACKGROUND OF THE INVENTION

The core of an aircraft wing is a section called a wing box. The wing box is fared into the aircraft fuselage and runs from the root towards the tip of the wing. The wing box provides the central sections of the upper and lower aerofoil surfaces for the wing in addition to attachment points for engines and control surfaces such as ailerons, trim flaps and airbrakes. The aerofoil surfaces of the wing box are provided by panels referred to as wing covers. The wing covers include a number of structural elements called stringers, which run within the wing box structure from the root towards the tip. The stringers are arranged to provide the necessary structural stability and integrity to enable the wing covers to cope with the operational loads on the wing.

When building aircraft structures, one of many considerations is the balance between weight and strength. In other words, structures need to be as light as possible while providing the necessary strength and structural integrity to perform properly under operational loads. The loads on a wing vary along its span and typically reduce towards the wing tip. Therefore, stringers can be built to have strength that varies along their length, thus reducing their overall weight. Stringers are commonly created by joining or splicing stringer sections, each section having weight characteristics tailored to its expected loading. Alternatively, a single stringer can be provided and machined to a varying degree along the span so as to reduce unnecessary weight.

A problem with splicing or joining sections of stringer is that it adds extra weight and complexity to the wing box. A problem with machining a single stringer is that the amount by which the stringer can be modified is limited.

SUMMARY OF THE INVENTION

An embodiment of the present invention provides a method of creating a stringer for an aircraft wing, the method comprising the steps of:
a) forming a stringer blank having:
a pair of spaced apart flanges for attachment to a wing cover panel, the flanges having upper and lower surfaces, the lower surface being arranged for attachment to the wing cover panel;
one or more side panels integral with the flanges and extending away from the flanges; and
a crown integral with the side panels; and
b) machining the lower surface of the flange so as to modify the height of the stringer along its length.

The upper surface may be machined to provide the flange with constant thickness along the length of the stringer. The crown may be machined so that the thickness of the crown varies along the length of the stringer. The dimension of the crown may vary so as to maintain the height of the stringer along its length.

The stringer blank may comprise two spaced apart flanges for attachment to a wing cover panel, the flanges having opposing inner ends; two side panels integral with the inner ends of the flanges; and the crown arranged in a plane generally parallel to the flanges and having an inner face and an outer crown face, the inner crown face being arranged to face an attached wing cover panel.

The inner crown face may be machined so as to vary the thickness of the crown along the length of the stringer. The stringer blank may be a single continuous length. The or each modifying step may be carried out by machining the stringer blank formed by extrusion. The stringer blank may be formed from a metal or a metal alloy.

Another embodiment provides a stringer blank for providing a stringer for an aircraft wing, the stringer blank comprising:
a pair of spaced apart flanges for attachment to a wing cover panel, the flanges having upper and lower surfaces, the lower surface being arranged for attachment to the wing cover panel;
one or more side panels integral with the flanges and extending away from the flanges;
a crown integral with the side panels; and
the flanges being formed so as to provide a flange envelope enabling the machining of the lower surface of the flange so as to modify the height of the stringer along its length.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
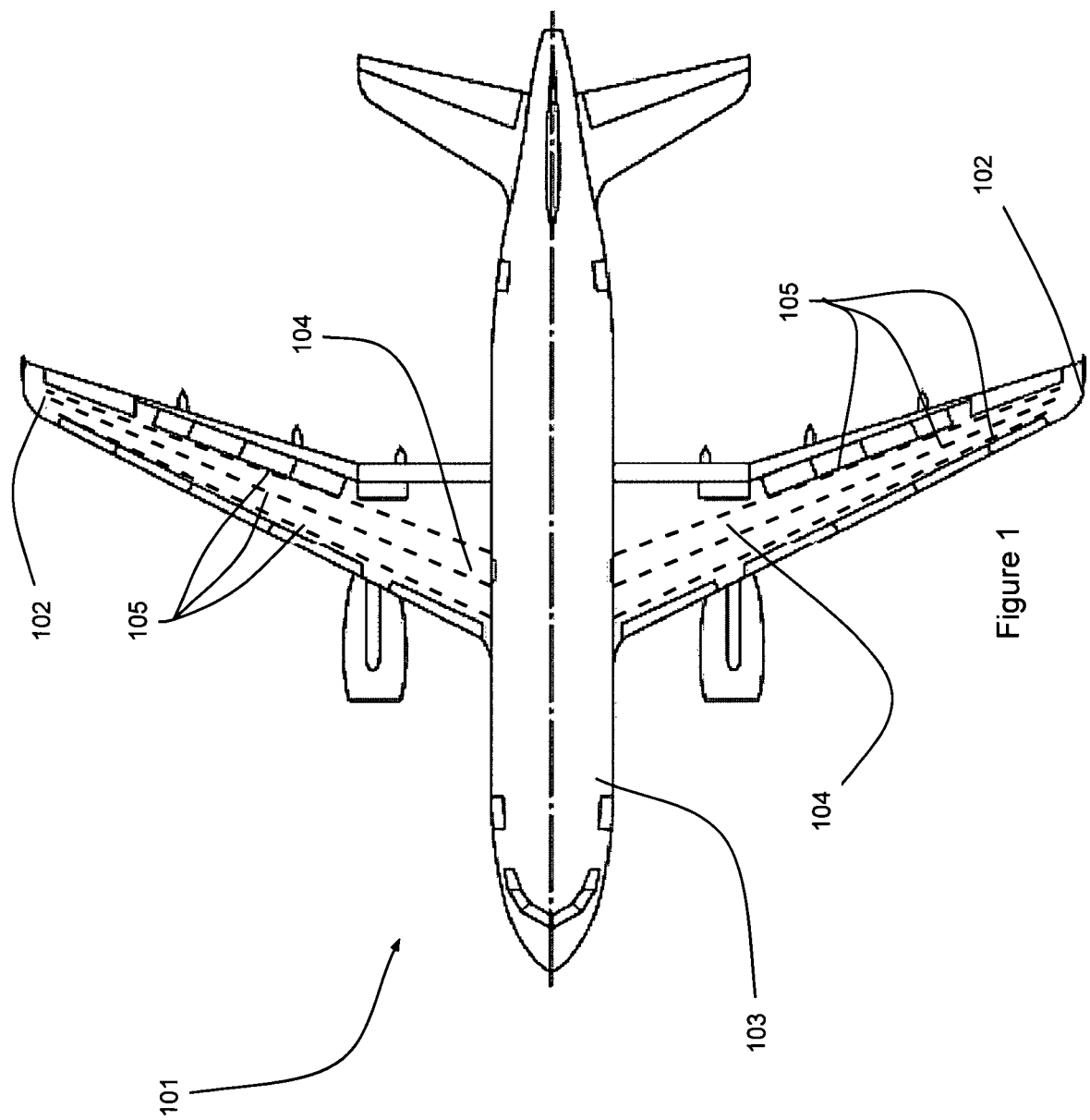
FIG. 1 is a plan view of an aircraft.

With reference to FIG. 1, an aircraft 101 comprises wings 102 attached to a fuselage 103. The wings 102 comprise a central structural element 104 in the form of a wing box. The wing box 104 runs from the root to the tip of each wing 102 and between the leading and trailing edges of the wing. The wing box 104 comprises a number of structural elements 105 in the form of stringers, which run from the root to the tip of each wing box 104.

Figure 2:
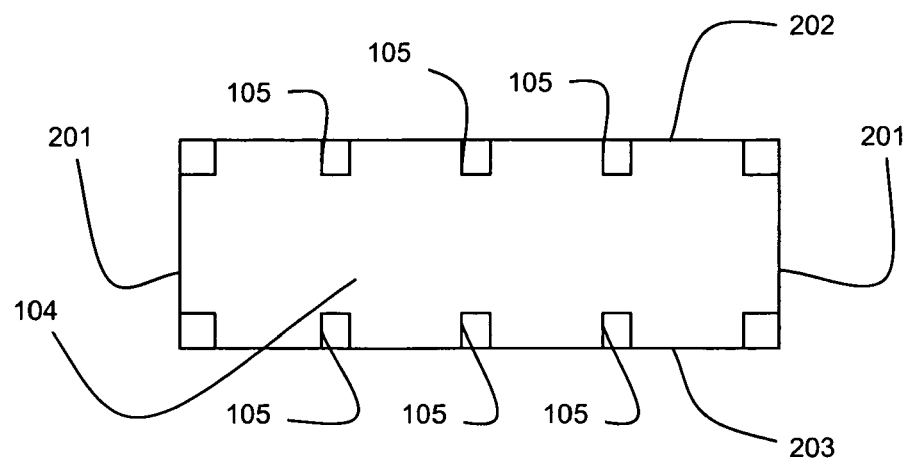
FIG. 2 is a cross-sectional view of a wing box of the aircraft of FIG. 1.

With reference to FIG. 2, the wing box 104 is constructed from two side members 201 in the form of spars, which provide attachment points for the leading and trailing edge structures (not shown) of the wing 102. The upper and lower surfaces 202, 203 of the wing box 104 are each formed from wing cover panels, which provide the upper and lower aerofoil surfaces of the wing 102. The stringers 105 are attached to the interior surface of the wing cover panels 202, 203.

Figure 3:
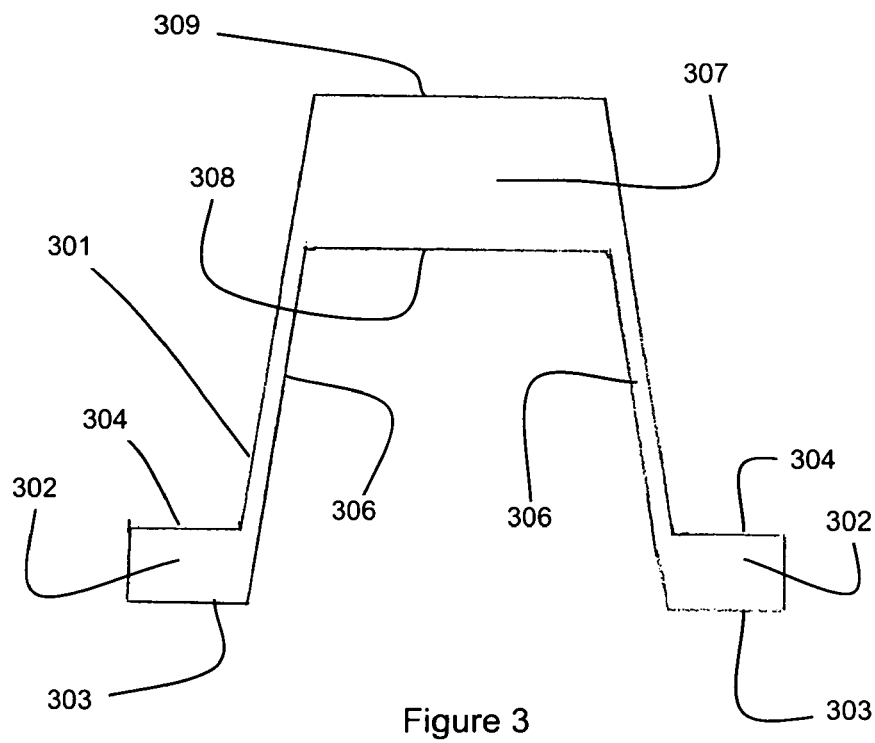
FIG. 3 is a cross-sectional view of a stringer blank for use in manufacturing stringers for the wing box of FIG. 2.

With reference to FIG. 3, the stringers 105 are formed by extruding constant cross-section blank stringers 301 from aluminium alloy. The blank stringers 301 have two spaced apart attachment members 302 in the form of flanges for providing attachment points to a wing cover. The flanges 302 have lower faces 303, which face an attached wing cover and opposing upper faces 304. Side panels 306 extend away from the interior ends of the flanges 302 in converging planes. The side panels 306 are joined by a top panel 307, which forms a crown to the stringer blank 301. The crown 307 has a lower face 308, which faces an attached wing cover and an opposing upper face 309, which provides the upper or top surface of the stringer blank 301. Since the stringer blanks 301 are extruded, the flanges 302, side panels 306 and crown 307 are integrally formed.

The stringer blank 301 is arranged to have an envelope, which encompasses all of the desired cross-sections of a given finished stringer, where each cross-section is designed to impart particular characteristics that maintain the structural stability of the attached wing cover under operational loading. The stringer blank 301 is used to form a continuous stringer by machining, to varying degrees, the upper and lower faces 303, 304, 308, 309 of the blank stringer 301 to remove amounts of material along its length. In this manner, the performance of the stringer can be optimised to provide differential performance along its length and to minimise its weight.

Figure 4:
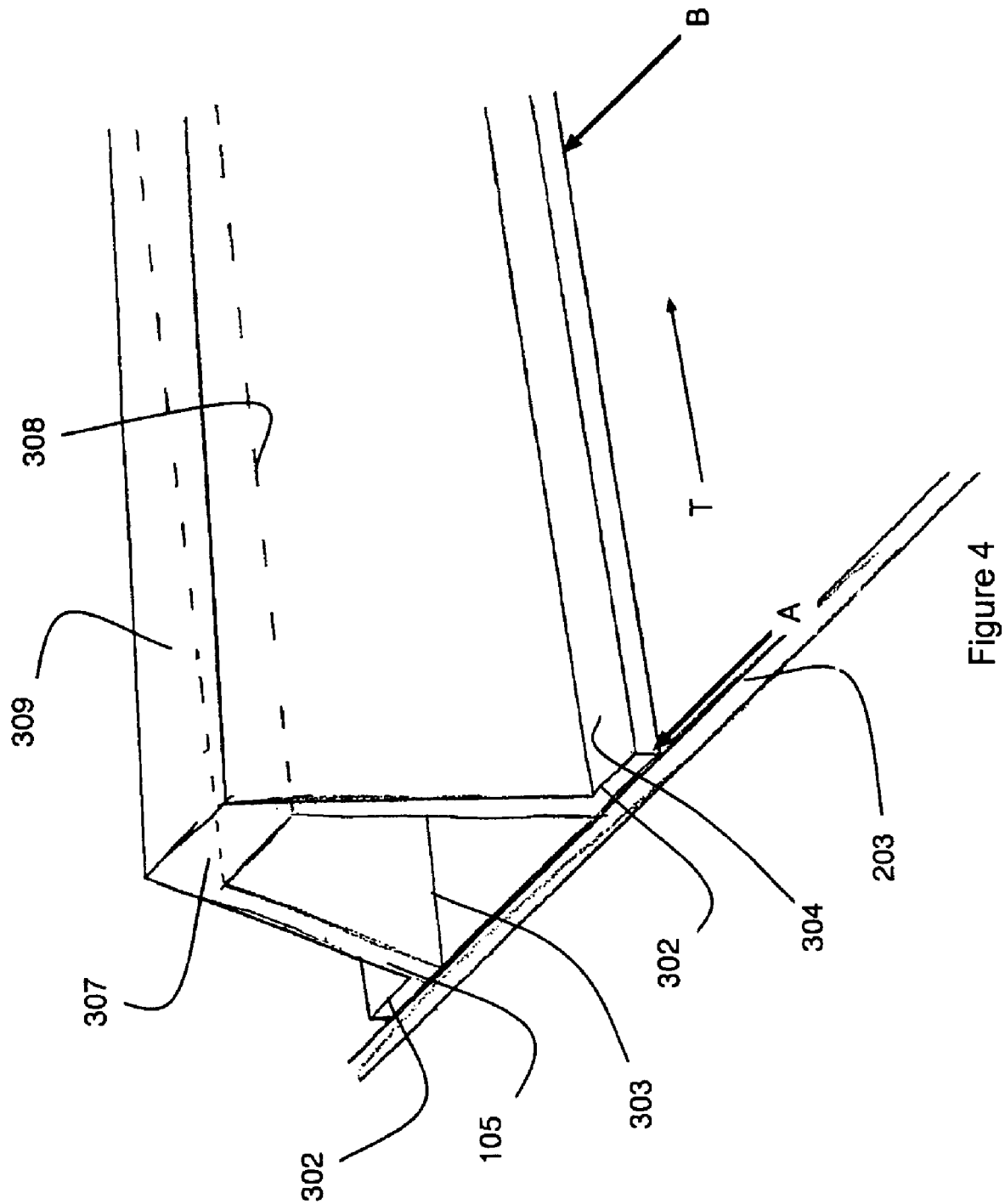
FIG. 4 shows a side view of a stringer in the wing box of FIG. 2.

FIG. 4 shows a stringer 105 from FIG. 2 in further detail, which has been machined from the blank stringer 301 and attached to the wing cover panel 203. FIG. 4 shows the end of the stringer 105 at the root of the wing 102, with the direction of the wing tip indicated by arrow T. The stringer 105 is designed to enable the wing cover panel 203 to cope with relatively high loads at its end near the wing root and progressively lower loads in the direction T towards its end near the wing tip. During the manufacture of the stringer 105 from a stringer blank 301, the upper face 309 of the crown 307 has been machined so as to remove an increasing amount of material along its length in the direction T, thus reducing the overall weight of the stringer 105 by reducing the thickness of the crown 307. In other words, the thickness of the crown 307 of the stringer 105 tapers in the direction T. Similarly, the upper and lower faces 304, 303 of each flange 302 have been machined to remove decreasing and increasing amounts of material in the direction T from the upper and lower faces respectively, thus further reducing the height of the stringer 105 in the direction T.

Figure 5A:
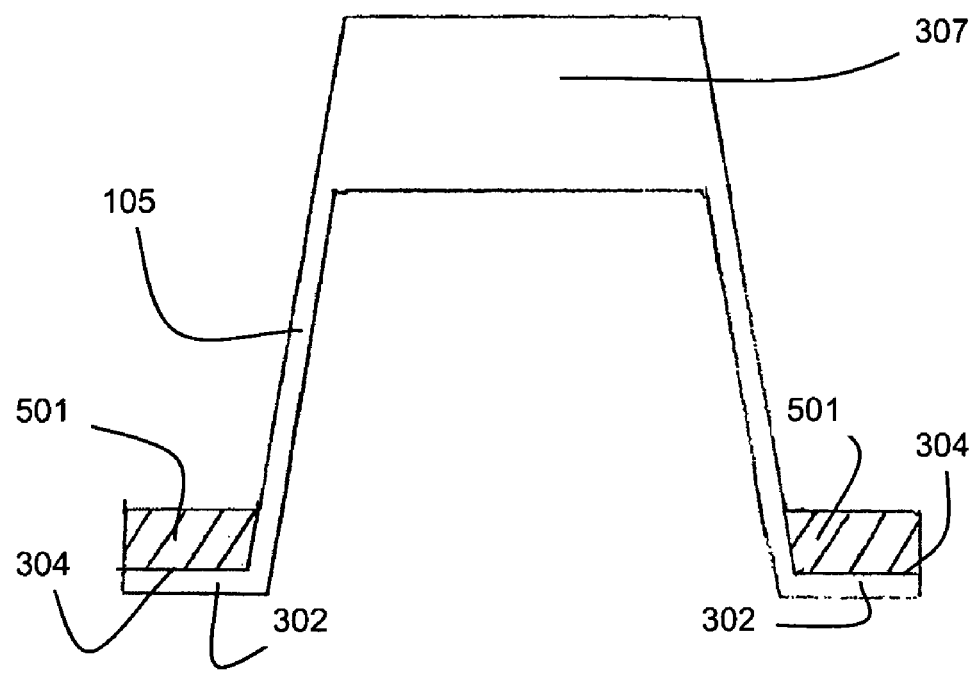
FIGS. 5a and 5b show cross-sectional views of the stringer of FIG. 4.
Figure 5B:
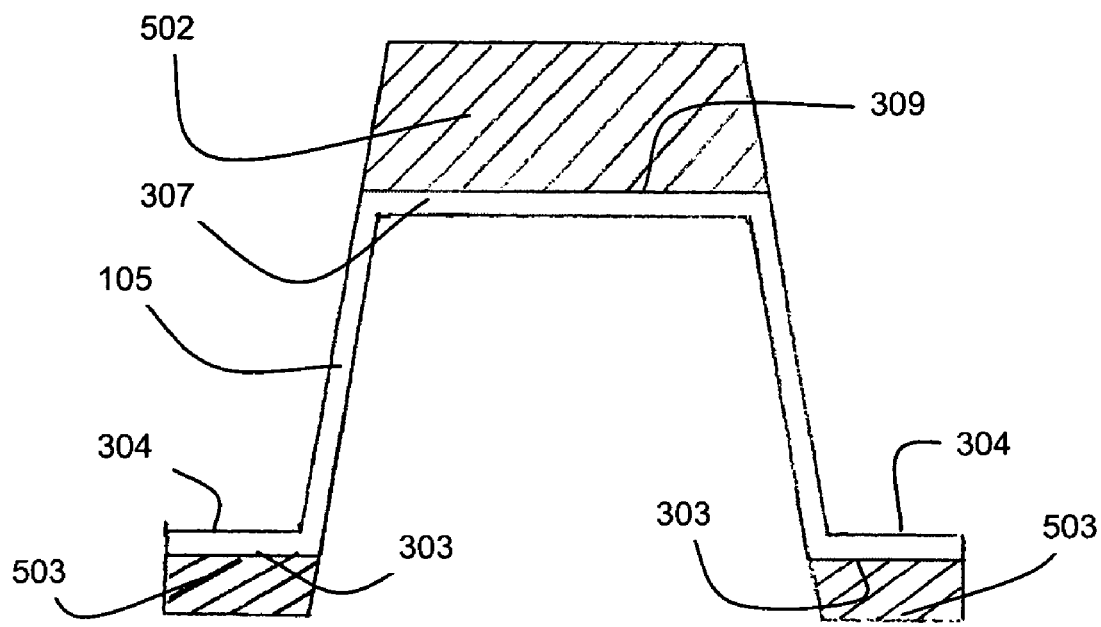

FIG. 5a is a cross-section of the stringer 105 of FIG. 4 at point A. While the crown 307 remains at or near the thickness at which it was extruded, the thickness of the flanges 302 has been reduced, by removing material 501 from their upper faces 304. Thus, the cross-section of the stringer 105 is relatively high at its root end. FIG. 5b is a cross-section of the stringer 105 of FIG. 4 at point B towards its wing tip end. The thickness of the crown 307 has been reduced by the removal of material 502 from its upper face 309. Also, while the upper faces 304 of the flanges 302 remain the same as on the stringer blank 301, the thickness of the flanges 302 is reduced by the removal of material 503 from their lower faces 303. The overall height of the cross-section of the stringer has been reduced from that of the section at point A. While the thickness of the flanges 302 remain constant, at the points between the cross sections at point A and B shown in FIGS. 5a and 5b, the material 501, 503 removed from the respective upper and lower faces 304, 303 decreases and increases respectively in the direction T. In this manner, the overall height of the stringer 105 cross section decreases in the direction T, while the thickness of the flanges 302 remain constant. Thus the stringer is tailored to enable it to impart the necessary structural stability to a wing cover to which it is attached. In the present embodiment, this loading is greatest at the wing root and progressively decreases towards the wing tip. Such tailoring helps to improve optimum manufacturing efficiency and reduce the amount of materials used.

Figure 6A:
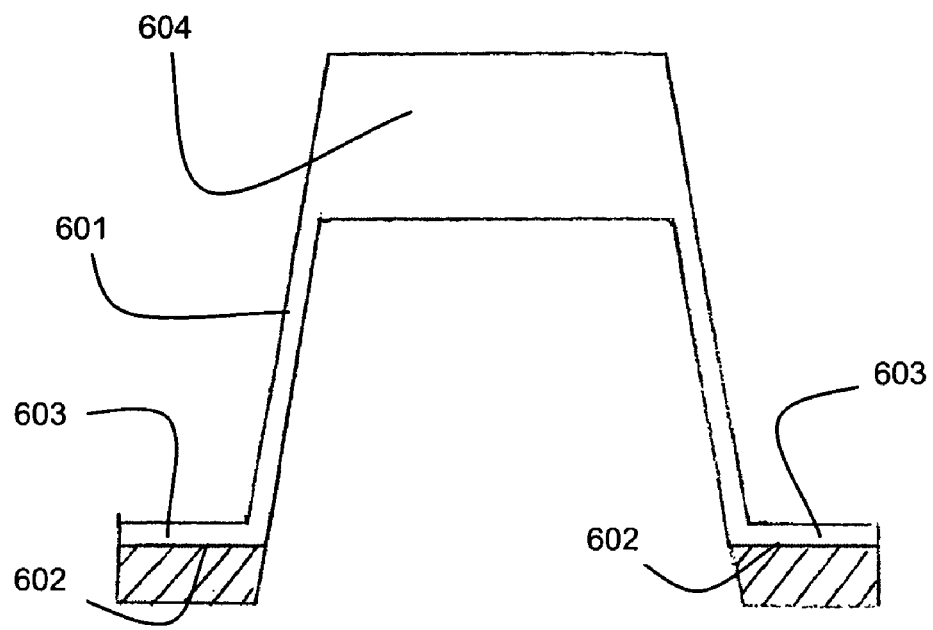
FIGS. 6a, 6b and 6c show cross-sectional views of stringers of other embodiments.
Figure 6B:
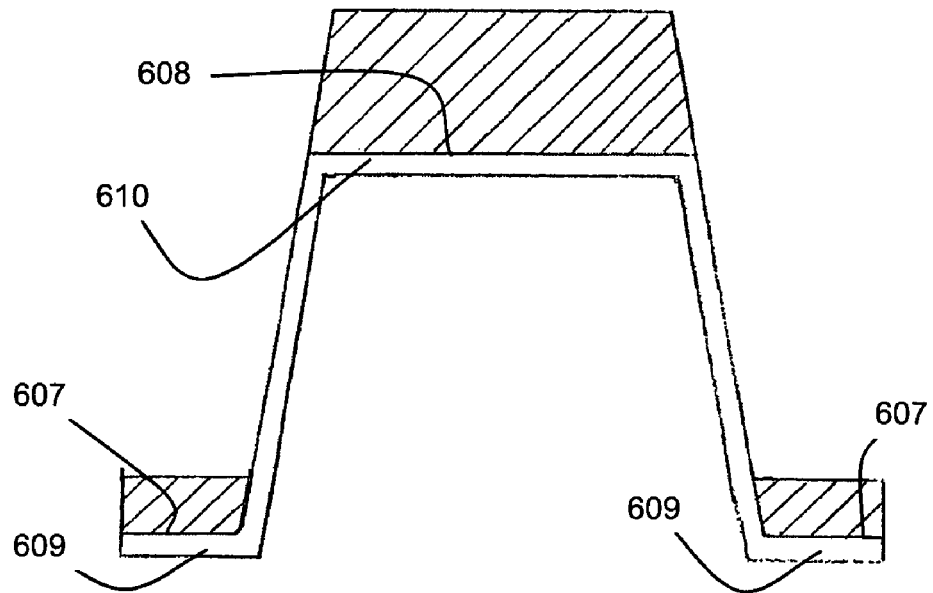
Figure 6C:
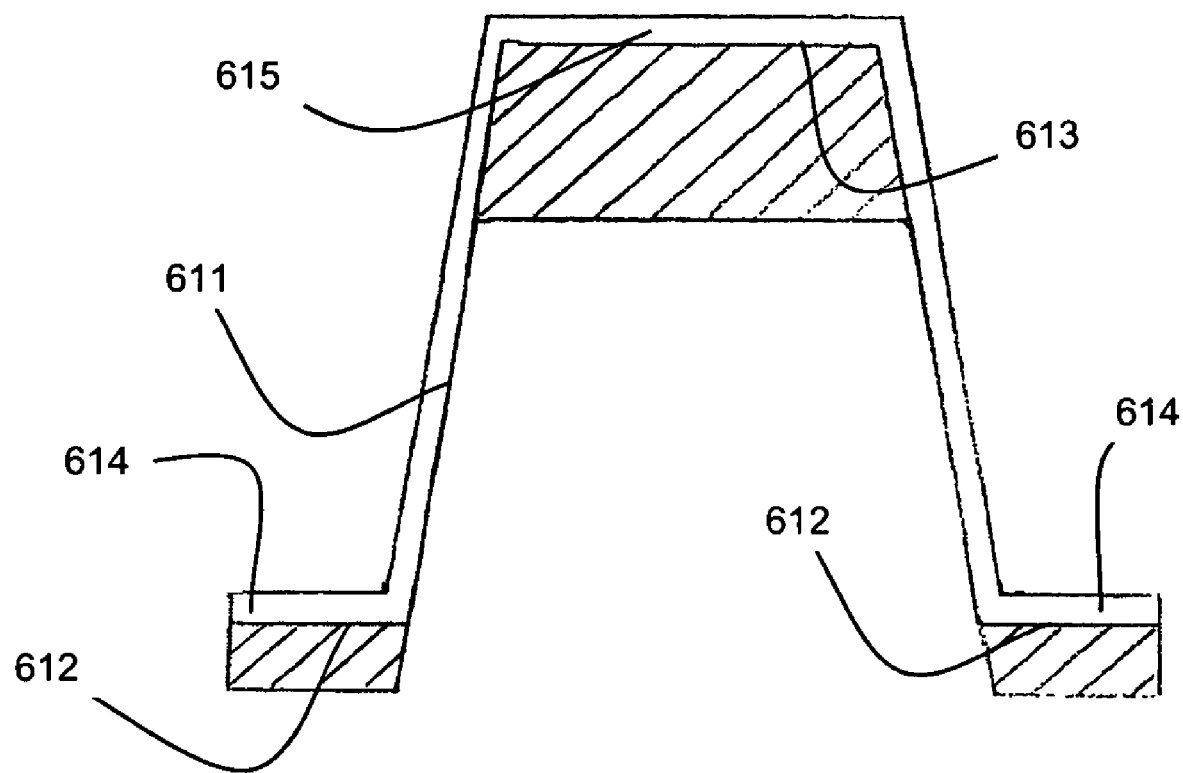

FIG. 6a shows a cross-section for a stringer 601 in another embodiment. The stringer 601 has been machined from a blank stringer 301 by removing material from the lower faces 602 of the flanges 603. Thus the overall height of the section of stringer 601 has been reduced while maintaining the thickness of the crown 604. FIG. 6b shows a cross-section for a stringer 606 machined from a blank stringer 301 by removing material from the upper surfaces 607, 608 of both the flanges 609 and the crown 610. Both the height and the crown thickness of this section of stringer 606 have been reduced. All of the machining required to produce this section of stringer 606 can be carried out from one side of the stringer blank 301, thus reducing manufacturing costs. FIG. 6c shows a cross-section for a stringer 611 machined from a blank stringer 301 by removing material from the lower faces 612, 613 of the flanges 614 and the crown 615. While the height of this section of stringer 611 has been reduced slightly, the crown thickness has been reduced to near its minimum. All of the machining required to produce this section of stringer 611 can be carried out from one side of the stringer blank 301, thus reducing manufacturing costs.

In a further embodiment, the stringer extrusion has an "I" or "J" cross-section which also provide a pair of flanges for attachment of the stringer to a wing cover. The stringer is integrally formed, with the flanges joining a single panel or web, which, in turn, connects the flanges to the crown of the stringer. The crown is also referred to as the free flange. The flanges or crown of these cross sections of stringer may be extruded to provide an envelope of material from which the required working dimensions of the flanges or crown can be machined.

In another embodiment, the crown of the stringer is extruded at or near to its finished thickness and remains constant for the length of the finished stringer. The height or weight of the stringer can be optimised by machining the thickness of the flanges, which attach the stringer to wing cover panel.

As will be understood by those skilled in the art, the relative configurations of the flanges, the or each side panel and crown may be varied to suit the particular application of a given stringer. For example, where two side panels are provided in the stringer cross section, these may be arranged in converging, diverging or parallel planes relative to each other, depending on their particular application.

As will be understood by those skilled in the art, machining of the stringer blank may be carried out by any suitable process such as milling, etching, abrading, punching, routing or drilling. Furthermore, the stringers may be formed from any suitable material such as a metal, metal alloy or other suitable non-metallic material.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method of creating a stringer for an aircraft wing, said method comprising the steps of:
   a) extruding a stringer blank having:
   a pair of spaced apart flange envelopes for attachment to a wing cover panel, each of said flange envelopes flanges having upper and lower surfaces, said lower surface being arranged for attachment to said wing cover panel; one or more side panels integral with said flange envelopes flanges and extending away from said flange envelopes flanges; and
   a crown integral with said side panels; and
   b) machining said lower surfaces of said flange envelopes so as to remove an increasing amount of material along their length in a direction from a wing root end to a wing tip end, such that the thickness tapers along said direction, in order to modify the height of said stringer along its length.

2. A method according to claim 1, further comprising the step of machining the upper surfaces of the flange envelopes so as to remove a decreasing amount of material along their length in a direction from the wing root end to the wing tip end in order to provide flanges with constant thickness along the length of the stringer.

3. A method according to claim 2, wherein
   two said side panels integral with said inner ends of said flanges; and
   said crown being arranged in a plane generally parallel to said flanges and having an inner crown face and an outer crown face, said inner crown face being arranged to face an attached wing cover panel, said method further comprising the step of machining an outer crown face to remove an increasing amount of material along its length thereof in a direction from the wing root end to the wing tip end.

4. A method according to claim 1 in which said stringer blank is a single continuous length.

5. A method according to claim 1 in which said stringer blank is formed from a metal or a metal alloy.

6. A stringer blank for providing for an aircraft wing, said stringer blank comprising: a pair of spaced apart flange envelopes for attachment to a wing cover panel, each of said flange envelopes having upper and lower surfaces, said lower surfaces being arranged for attachment to said wing cover panel; one or more side panels integral with said flange envelopes and extending away from said flange envelopes; a crown integral with said side panels; and said lower surfaces of said flange envelopes are machined to remove an increasing amount of material along their length in a direction from the wing root end to the wing tip end, such that the thickness tapers along said direction, in order to modify the height of said stringer along its length.

7. A stringer blank according to claim 6, wherein the upper surfaces of said flange envelopes are machined to remove a decreasing amount of material along their length in a direction from the wing root end to the wing tip end so as to provide flanges with constant thickness along the length of the stringer.

8. A stringer blank according to claim 7, wherein
   said crown is arranged in a plane generally parallel to said flange envelopes and said crown having an inner crown face and an outer crown face, said inner crown face being arranged to face an attached wing cover panel, and wherein said outer crown face is machined to remove an increasing amount of material along its length in a direction from the wing root end to the wing tip end.

9. A stringer blank according to claim 6 in which said stringer blank is a single continuous length.

10. A stringer blank according to claim 6 in which said stringer blank is formed from a metal or a metal alloy.

* * * * *